United States Patent
Izumi et al.

(10) Patent No.: US 10,348,170 B2
(45) Date of Patent: Jul. 9, 2019

(54) METHOD FOR MANUFACTURING A SEGMENTED LAMINATED CORE

(71) Applicant: Mitsui High-tec, Inc., Yahatanishi-ku, Kitakyushu-shi, Fukuoka (JP)

(72) Inventors: Masahiro Izumi, Kitakyushu (JP); Yusuke Hasuo, Kitakyushu (JP)

(73) Assignee: MITSUI HIGH-TEC, INC., Kitakyushu-Shi, Fukuoka (JP)

( * ) Notice: Subject to any disclaimer, the term of this patent is extended or adjusted under 35 U.S.C. 154(b) by 363 days.

(21) Appl. No.: 15/147,138

(22) Filed: May 5, 2016

(65) Prior Publication Data
US 2016/0329782 A1    Nov. 10, 2016

(30) Foreign Application Priority Data
May 7, 2015    (JP) .................. 2015-095086

(51) Int. Cl.
*H01F 3/04* (2006.01)
*H01F 7/06* (2006.01)
(Continued)

(52) U.S. Cl.
CPC .............. *H02K 15/02* (2013.01); *H02K 1/12* (2013.01); *H02K 15/024* (2013.01); *H02K 2201/09* (2013.01)

(58) Field of Classification Search
CPC ......... H02K 15/02; H02K 1/12; H02K 15/024
See application file for complete search history.

(56) References Cited

U.S. PATENT DOCUMENTS

| 5,142,178 A * | 8/1992 | Kloster .................... H02K 1/16 310/216.048 |
| 8,205,320 B2 * | 6/2012 | Akita ..................... H02K 1/148 29/596 |

(Continued)

FOREIGN PATENT DOCUMENTS

| JP | 3710706 B2 | 10/2005 |
| JP | 2005-318763 | 11/2005 |

(Continued)

OTHER PUBLICATIONS

Extended European Search Report for EP App No. 16168221.6 dated Oct. 17, 2016, 7 pgs.

*Primary Examiner* — Paul D Kim
(74) *Attorney, Agent, or Firm* — Procopio, Cory, Hargreaves & Savitch LLP (57) ABSTRACT

A method for manufacturing a segmented laminated core is provided. This method includes (A) feeding a metal sheet to a progressive die, (B) stamping out workpieces in the progressive die, workpieces each include a plurality of pieces aligned in the circumferential direction with a circumferential part, and (C) fastening the workpieces together to obtain a segmented laminated core. The step (B) includes (b1) performing cutting-and-bending processing to form a slit line and a bending line across a region configured to be the circumferential part, (b2) returning by push-back a bent part that is a portion between the slit line and the bending line to an original position, and (b3) forming a swaged portion on the bent part. The step (C) includes (c1) fastening the workpieces by the swaged portion.

5 Claims, 10 Drawing Sheets

(51) Int. Cl.
*H02K 15/02* (2006.01)
*H02K 1/12* (2006.01)

(56) References Cited

U.S. PATENT DOCUMENTS

| | | | |
|---|---|---|---|
| 8,264,117 B2* | 9/2012 | Abe | H02K 1/146 |
| | | | 29/596 |
| 8,720,039 B2 | 5/2014 | Matsubara et al. | |
| 2003/0066183 A1* | 4/2003 | Nouzumi | H02K 1/148 |
| | | | 29/596 |
| 2011/0277939 A1* | 11/2011 | Hirata | H02K 15/02 |
| | | | 156/513 |
| 2013/0075029 A1 | 3/2013 | Hirata | |
| 2014/0109391 A1* | 4/2014 | Matsubayashi | H02K 15/0025 |
| | | | 29/596 |
| 2014/0210306 A1* | 7/2014 | Suzuki | H02K 5/15 |
| | | | 310/216.134 |
| 2016/0336840 A1* | 11/2016 | Hasuo | H02K 15/022 |
| 2017/0361369 A1* | 12/2017 | Horii | B21D 28/02 |

FOREIGN PATENT DOCUMENTS

| | | |
|---|---|---|
| JP | 2005-318764 A | 11/2005 |
| JP | 2015-167454 A | 9/2015 |

* cited by examiner

METHOD FOR MANUFACTURING A SEGMENTED LAMINATED CORE

CROSS-REFERENCE TO RELATED APPLICATION

This application is based upon and claims the benefit of priority from Japanese Patent Application No. 2015-095086, filed May 7, 2015, the entire contents of which are incorporated herein by reference.

BACKGROUND

1. Field

This disclosure relates to a segmented laminated core and a method for manufacturing the same.

A laminated core is a component of a motor. The laminated core is formed by stacking a plurality of magnetic steel sheets (workpieces) each of which is processed in a predetermined shape and fastening the sheets together. The motor includes a rotor and a stator each of which contains a laminated core, and is produced through a step of winding a coil on the stator and a step of attaching a shaft to the rotor, for example. Motors incorporating laminated cores have been conventionally used as driving sources for refrigerators, air conditioners, hard disc drives, and electric tools, for example, and are also used recently as driving sources for hybrid cars and motors for electric power steering systems, for example.

2. Related Background Art

Japanese Patent No. 4472417 discloses a method for manufacturing a segmented laminated core. Referring to FIG. 7 and FIG. 8 in Japanese Patent No. 4472417, slit lines L are formed by cutting-and-bending processing and push-back (see paragraphs [0028] to [0032] in Japanese Patent No. 4472417).

SUMMARY

One aspect of this disclosure relates to a method for manufacturing a segmented laminated core. This manufacturing method includes the following steps:

(A) feeding a plate for processing drawn from a roll thereof to a progressive die, (B) stamping out workpieces in the progressive die, each workpieces including a plurality of pieces aligned in the circumferential direction with a circumferential part, and (C) fastening the workpieces together to obtain a segmented laminated core.

The step (B) includes (b1) performing cutting-and-bending processing to form a slit line and a bending line across a region configured to be the circumferential part, (b2) returning by push-back a bent part that is a portion between the slit line and the bending line to an original position, and (b3) forming a swaged portion on the bent part. The above-described step (C) includes (c1) fastening the workpieces by the swaged portion.

DETAILED DESCRIPTION

Hereinafter, a plurality of embodiments of the present invention will be described with reference to the accompanying drawings. In the description of the drawings, the same elements will be designated by the same reference numerals and a duplicate description thereof will be omitted. The drawings and the related technologies are provided in order to describe the embodiments of the present invention, and do not limit the scope of the present invention.

<Laminated Core and Workpiece>

Figure 1:
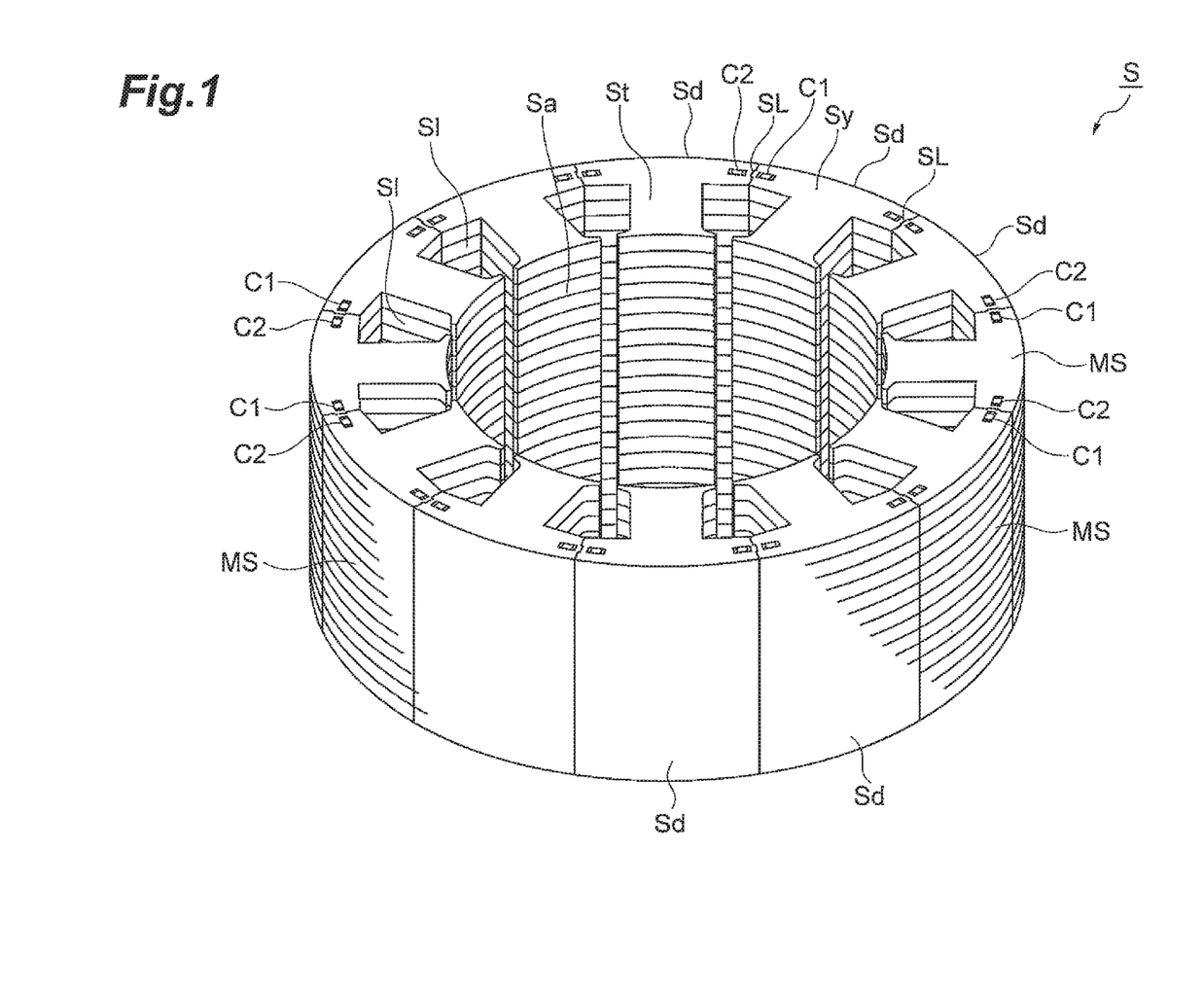
FIG. 1 is a perspective view of one example of a segmented laminated core for a stator.

FIG. 1 is a perspective view of a segmented laminated core S constituting a stator. The shape of the laminated core S is substantially cylindrical. An opening Sa positioned in its central part is used for arranging a rotor (not depicted). A plurality of workpieces MS constitute the laminated core S. The laminated core S has a circumferential yoke part Sy and tooth parts St extending from the inner periphery of the yoke part Sy toward the center. Depending on the usage and performance of the motor, the width of the yoke part Sy is about 2 to 40 millimeters. The laminated core S includes a total of 12 core pieces Sd, and each core pieces Sd has one tooth part St. Thus, the laminated core S has 12 tooth parts St in total. The number of the core pieces Sd (the number of the tooth parts St) constituting one laminated core S is not limited to 12. Spaces called "slots" (hereinafter referred to as "slots S1") are formed between adjacent tooth parts St. When the laminated core S is a stator for an electric power steering system, the outer diameter of the laminated core S is about 50 to 100 millimeters.

Figure 2:
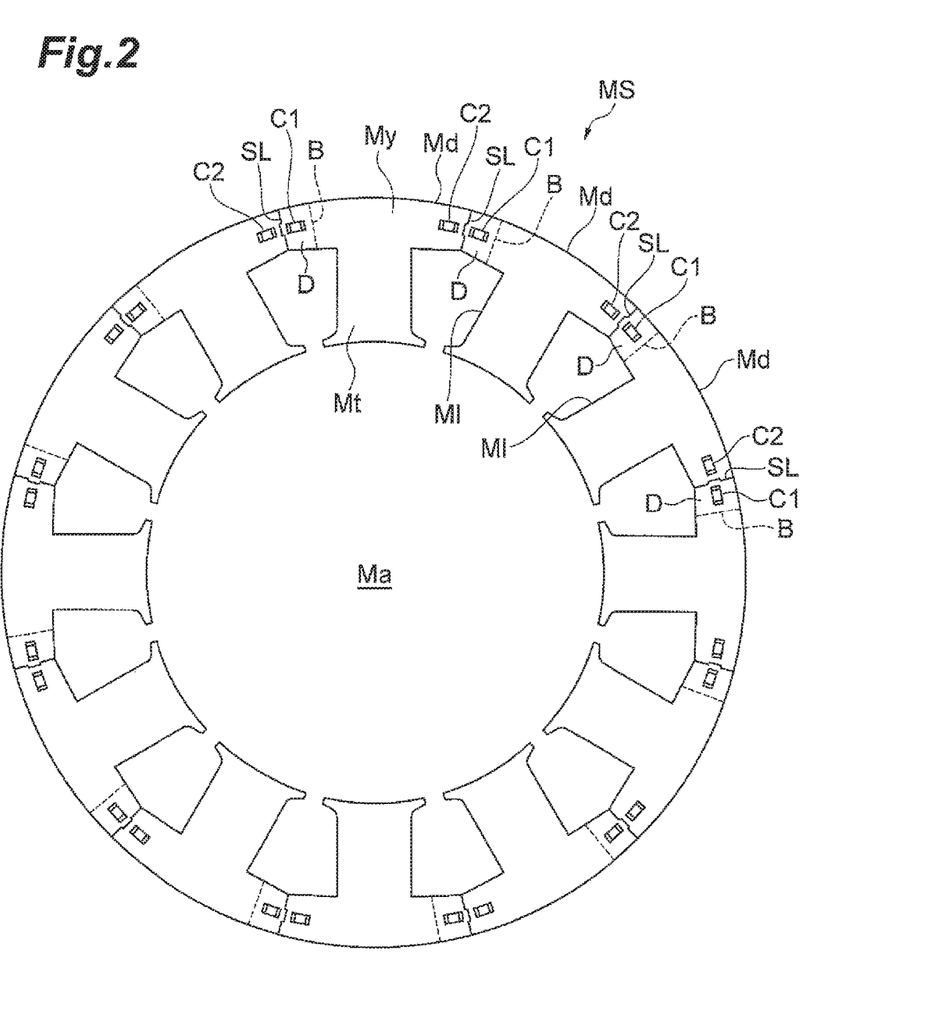
FIG. 2 is a plan view of a segmented workpiece constituting the laminated core depicted in FIG. 1.

The laminated core S is produced by stacking the workpieces MS depicted in FIG. 2 and fastening the workpieces together by 12 pairs of swaged portions C1 and C2. As depicted in FIG. 2, the shape of each workpiece MS in plan view is the same as that of the laminated core S. The workpiece MS includes a through hole Ma constituting the opening Sa, a circumferential part My constituting the yoke part Sy, and protruding parts Mt constituting the tooth parts St. The workpiece MS includes a total of 12 pieces Md, and each piece Md has one protruding part Mt. Thus, the workpiece has 12 protruding parts Mt in total. Slot holes M1 constituting the slots S1 are formed between adjacent protruding parts Mt.

The circumferential part My of the workpiece MS has a plurality of slit lines SL formed across the circumferential part My. Each slit line SL is formed so that a projection will fit into a depression. The shape of the slit line SL is not limited to the shape having the depression and the projection as depicted in FIGS. 1 and 2 and may be a linear shape (that may tilt with respect to the radial direction), a curved shape, or a combination thereof.

The swaged portions C1 and C2 are formed so as to be aligned in the circumferential direction of the yoke part Sy. More specifically, the pairs of the swaged portions C1 and C2 are formed with the 12 slit lines SL, which are lines dividing the workpiece MS into a plurality of pieces, respectively interposed therebetween. The workpieces MS may be more securely fastened to each other by, for example, a swaged portion on another part (protruding part Mt, for example), welding, adhesive, or a resin material, in addition to fastening by the swaged portions C1 and C2.

Each swaged portion C1 is formed on a bent part D that is a portion between the slit line SL and a bending line B on the circumferential part My of the workpiece MS. In other words, the swaged portion C1 is formed between the slit line SL and the bending line B. The term bending line B here means a folding line formed across a region configured to be the circumferential part My when the slit line SL is formed by cutting-and-bending processing in the manufacturing process of the workpiece MS. The bent part D is returned by push-back to an original position. It is difficult to return all the bent parts D plurally formed on each of the workpieces MS serially produced in large numbers to the original positions completely. Thus, some bent parts D may remain insufficiently returned to the original positions.

Figure 10A:
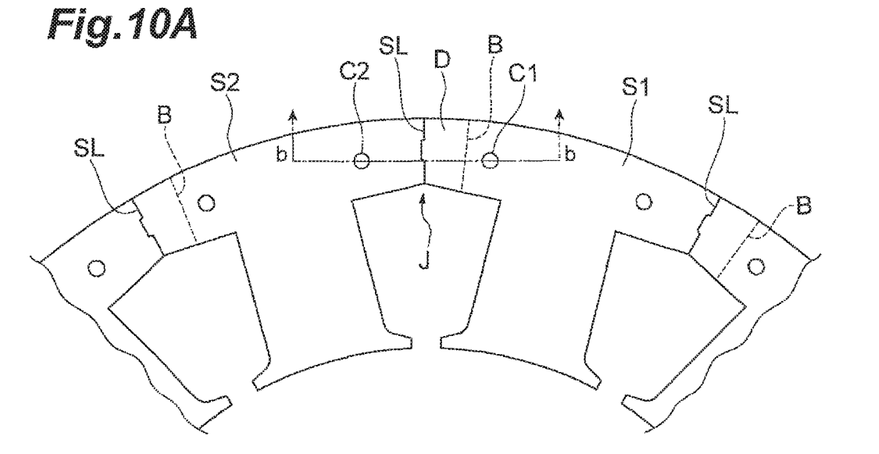
FIG. 10A is a diagram illustrating positional relations between a slit line SL, a bending line B, and a swaged portion C1 on conventional laminated core pieces.
Figure 10B:
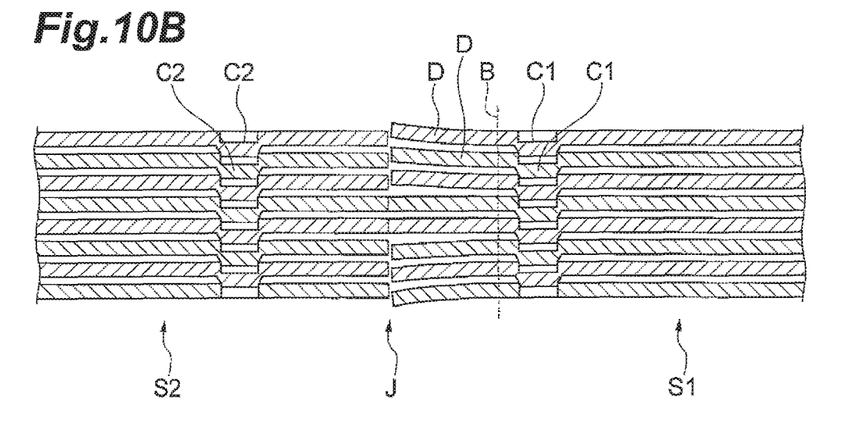
FIG. 10B is a sectional view along the line b-b depicted in FIG. 10A.

In this embodiment, the swaged portions C1 are formed at positions (on the bent parts D) near the slit lines SL to prevent connection parts J from being in the situation depicted in FIG. 10B even when some bent parts D remain insufficiently returned to the original positions in the workpieces MS to be laminated. In other words, the bent parts D can be sufficiently prevented from splitting in the laminating direction by fastening the bent parts D of the workpieces MS to be laminated to each other by the swaged portions C1. The distance between the slit line SL and the bending line B may be as short as possible to the extent that the swaged portion C1 can be formed on the bent part D. Specifically, this distance may be equal to or less than 15 or equal to or less than 10, for example, when the width of the yoke part Sy at the position of the slit line SL is 10.

Figure 3:
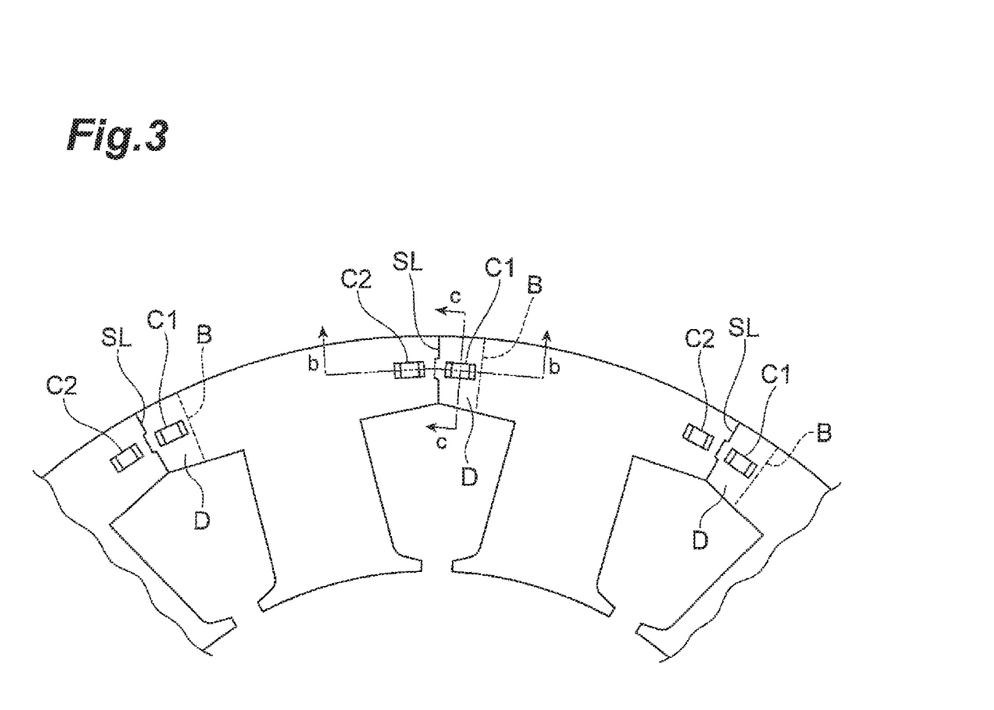
FIG. 3 is a plan view for illustrating positional relations between a slit line SL between adjacent two laminated core pieces, a bending line B, and a swaged portion C1.
Figures 4A, 4B, 4C:
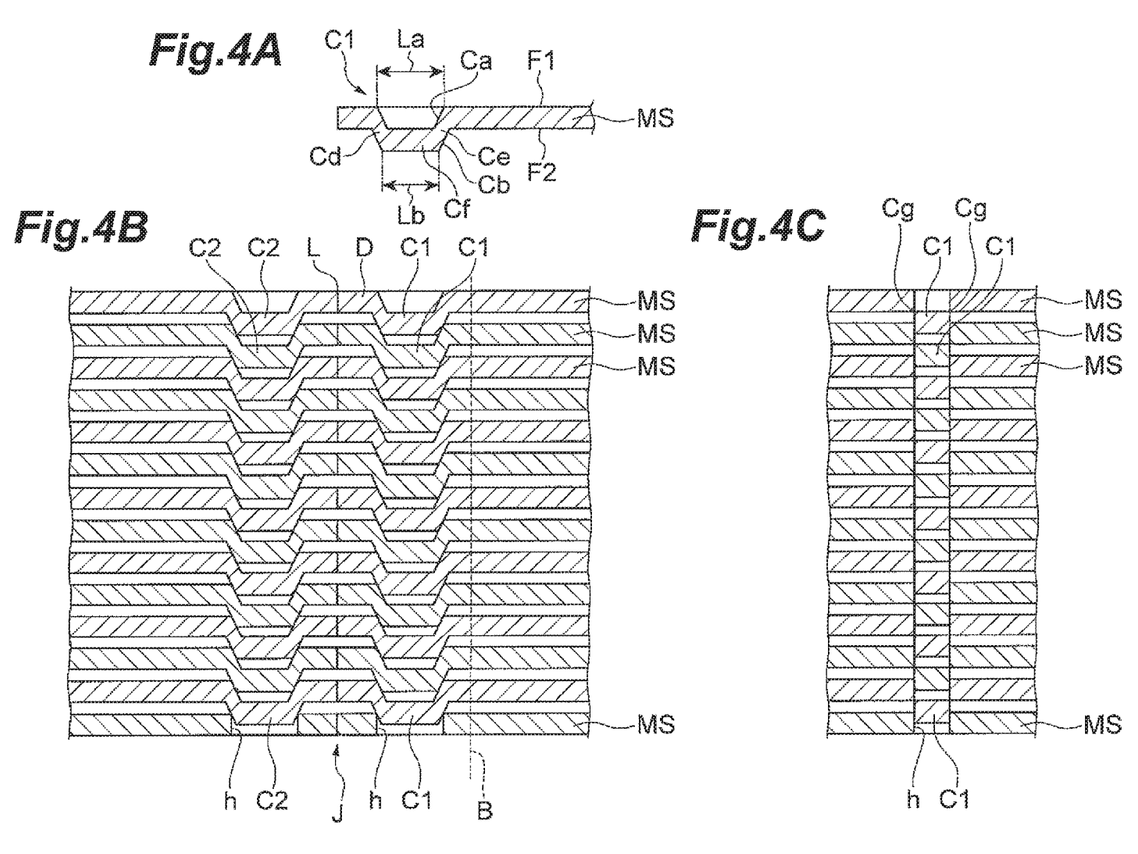
FIG. 4A is a sectional view for illustrating an opening length La of a depression in the swaged portion and a length Lb of the top of a projection in the swaged portion in the direction orthogonal to the bending line.
FIG. 4B is a sectional view along the line b-b depicted in FIG. 3.
FIG. 4C is a sectional view along the line c-c depicted in FIG. 3.

FIG. 4A illustrates a mode of the swaged portion C1 formed on the bent part D. As depicted in FIG. 4A, the swaged portion C1 includes a depression Ca on one face F1 of the workpiece MS and a projection Cb on the other face F2 of the workpiece MS. As depicted in FIG. 4A, an opening length La of the depression Ca in the swaged portion C1 is preferably larger than a length Lb of the top Ct of the projection Cb. The opening length La of the depression Ca and the length Lb of the top Ct of the projection Cb both mean lengths of the respective portions in the direction orthogonal to the bending line B (see FIG. 3).

FIG. 4B is a sectional view along the line b-b depicted in FIG. 3 and illustrates a state in which the laminated workpieces MS are fastened to each other by the swaged portions C1. The dashed line in FIG. 4B indicates the position of the bending line B. The depressions Ca and the projections Cb to be fitted can be more securely fastened to each other by forming the swaged portions C1 having the above-described constitution on the bent parts D. This is because the above-described condition (the length La>the length Lb) is satisfied and tilted parts Cd and Ce play a role as guides even when the positions of the depressions Ca and the projections Cb to be fitted are out of alignment to some extent with each other in the direction orthogonal to the bending line B.

Each swaged portion C1 is continuous in a longitudinal section in the direction orthogonal to the bending line B (see FIG. 4A). Specifically, the two tilted parts Cd and Ce and a flat part Cf therebetween constitute the swaged portion C1 in this longitudinal section. This constitution allows the above-described condition (the length La>the length Lb) to be satisfied. The tilted parts Cd and Ce and the flat part Cf can be formed by bending processing. The flat part Cf may not be necessarily formed from a viewpoint of satisfying the above-described condition (the length La>the length Lb).

As depicted in FIG. 4C that is a sectional view along the line c-c depicted in FIG. 3, the swaged portion C1 is discontinuous in a longitudinal section in the direction parallel to the extending direction of the bending line B. As depicted in FIG. 4C, cut surfaces Cg are formed on the sides of the swaged portion C1 in this longitudinal section. As depicted in FIG. 4B and FIG. 4C, two vertically adjacent workpieces MS are fastened to each other by fitting of the projection Cb of the upper workpiece MS into the depression Ca of the lower workpiece MS.

Through holes h are formed instead of the swaged portions C1 on a workpiece MS constituting the lowermost layer of the laminated core S. This is a constitution for preventing a laminated core S having been produced from being fastened to a laminated core S to be produced next by the swaged portions C1 during serial production of the laminated cores S.

Forming the swaged portions C1 having the above-described constitution on the bent parts D can prevent the bent parts D from splitting at the connection part J (see FIG. 4B). With this constitution, the laminated core S can achieve both high motor torque and low cogging torque at sufficiently high levels.

The swaged portion C2 and the swaged portion C1 form a pair. The swaged portion C2 is formed on a piece Md adjacent to a piece Md on which the swaged portion C1 is formed with the slit line SL interposed therebetween. In this embodiment, the swaged portion C2 has a constitution similar to that of the above-described swaged portion C1. The position at which the swaged portion C2 is formed is not on the bent part D (see FIG. 2). Thus, it is not particularly preferable that the swaged portion C2 satisfies the above-described condition (the length La>the length Lb) as the swaged portion C1 does. For this reason, the mode of the swaged portion C2 may not the same as the mode of the swaged portion C1, and a round swaged portion, a round flat swaged portion, and a square flat swaged portion may be employed as the swaged portion C2, for example.

<Stamping Device>

Figure 5:
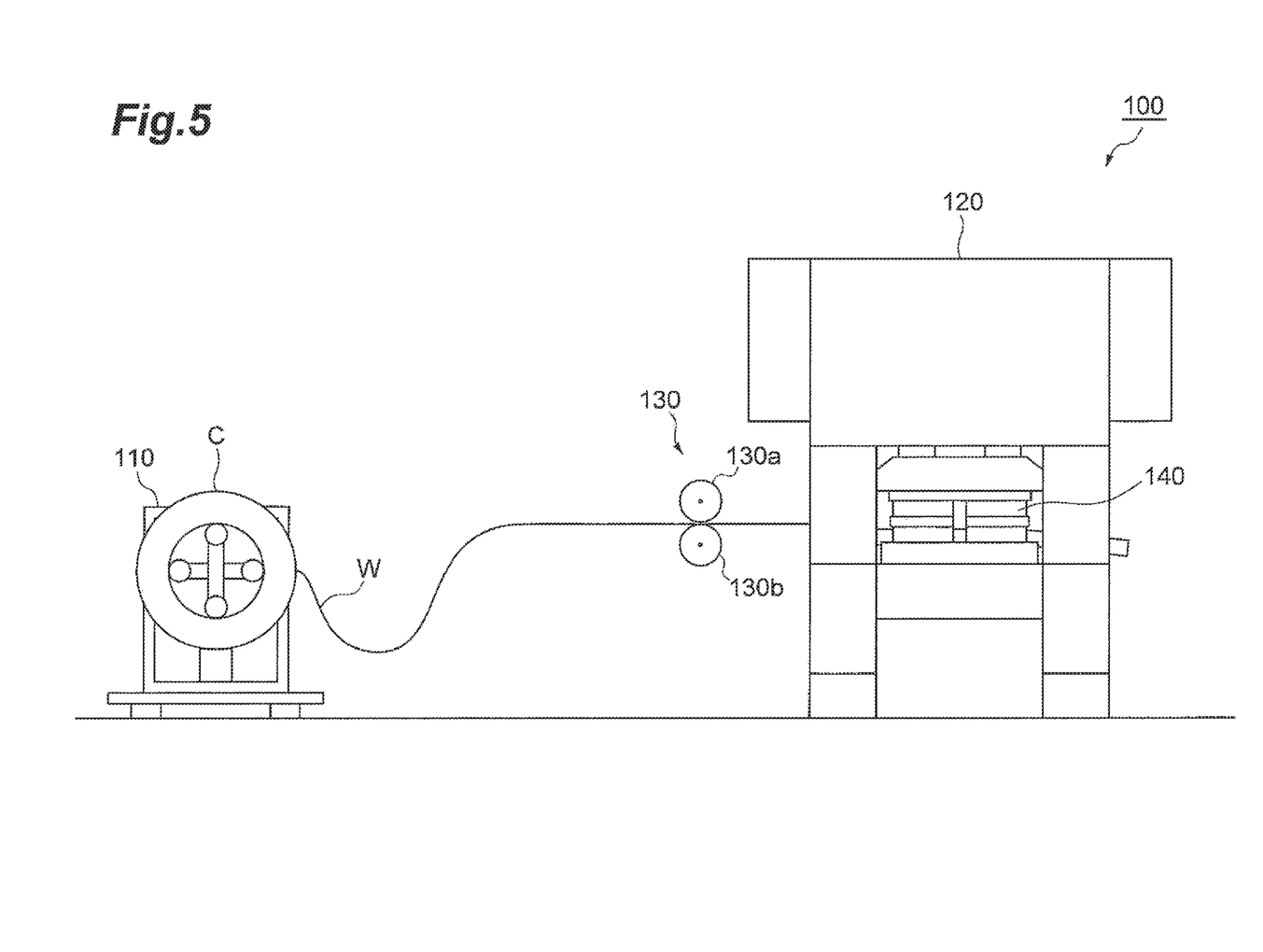
FIG. 5 is a schematic diagram illustrating one example of a stamping device.

FIG. 5 is a schematic diagram illustrating one example of a stamping device for producing the workpieces MS constituting the laminated core S by stamping. The stamping device 100 depicted in FIG. 5 includes an uncoiler 110 on which a roll C is mounted, a feeder 130 configured to feed a magnetic steel sheet (hereinafter referred to as "sheet W") drawn from the roll C, a progressive die 140 configured to perform stamping on the sheet W, and a press machine 120 configured to cause the progressive die 140 to operate.

The uncoiler 110 rotatably holds the roll C. The length of the magnetic steel sheet constituting the roll C is 500 to 10,000 meters, for example. The thickness of the magnetic steel sheet constituting the roll C may be about 0.1 to 0.5 millimeter, or may be about 0.1 to 0.3 millimeter from a viewpoint of achieving more excellent magnetic properties of the laminated core S. The width of the magnetic steel sheet (sheet W) may be about 50 to 500 millimeters.

The feeder 130 has a pair of rollers 130a and 130b that sandwich the sheet W from above and below. The sheet W is fed into the progressive die 140 via the feeder 130. The progressive die 140 is a device configured to serially perform stamping, cutting-and-bending processing, and push-back, for example, on the sheet W.

<Method for Manufacturing Laminated Core>

A method for manufacturing the laminated core S will be described next. The laminated core S is produced through a process of producing the workpieces MS (steps (A) and (B) below) and a process of producing the laminated core S from the workpieces MS (step (C) below). More specifically, the method for manufacturing the laminated core S includes the following steps:

(A) feeding the sheet W drawn from the roll C to the progressive die 140;

(B) stamping out workpieces MS in the progressive die 140, each workpiece including the pieces Md aligned in the circumferential direction with the circumferential part My; and (C) stacking the workpieces MS and fastening the workpieces MS together by the swaged portions C1 and C2 to obtain the laminated core S.

To begin with, the roll C of the magnetic steel sheet is prepared, and is mounted on the uncoiler 110. The magnetic steel sheet (sheet W) drawn from the roll C is fed to the progressive die 140 (step (A)).

In the progressive die 140, the workpieces MS are serially produced by performing stamping on the sheet W (step (B)). The above-described step (B) of this embodiment includes, before forming the workpieces MS by stamping out the workpieces MS on the outer circumferences, the following steps:

(b1) performing cutting-and-bending processing to form the slit line SL and the bending line B across a region configured to be the circumferential part My;

(b2) returning by push-back the bent part D that is a portion between the slit line SL and the bending line B to the original position; and (b3) forming the swaged portion C1 on the bent part D.

At the step (B), the step (b3) may be performed before the step (b1), but it is preferable to perform the step (b3) and the step (b2) at the same time or perform the step (b3) after the step (b2), from a viewpoint of reliably preventing the swaged portion from being crushed by push-back.

Figure 6A:
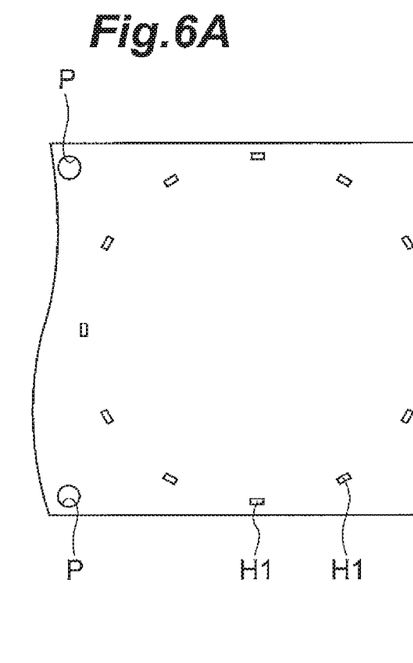
FIG. 6A to FIG. 6C are plan views for illustrating the first half of a strip layout for stamping in a progressive die.
Figure 6B:
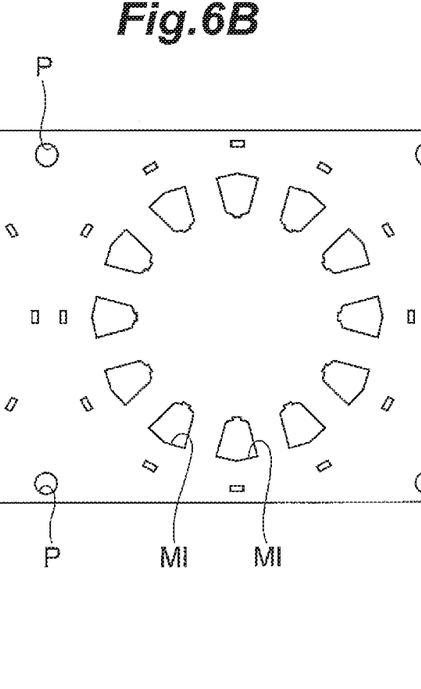
Figure 6C:
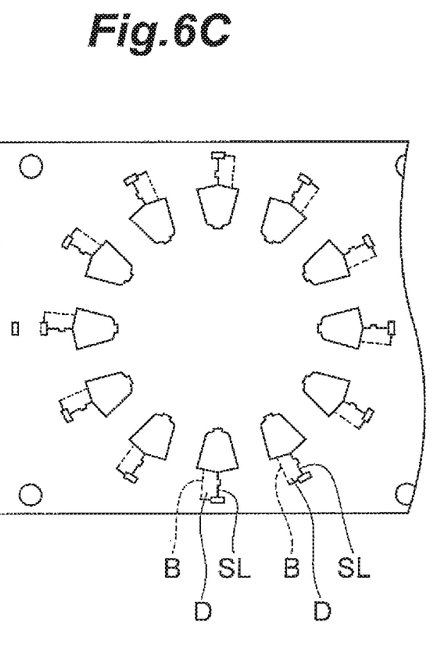
Figure 7A:
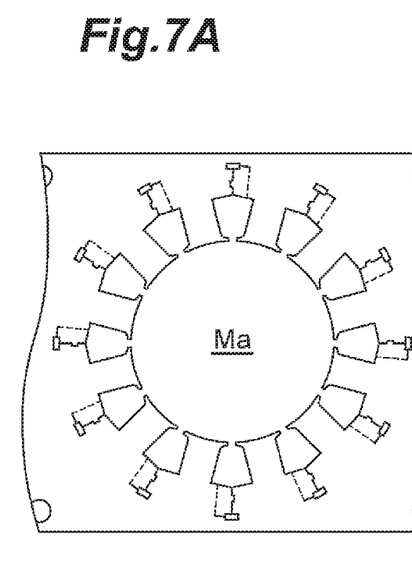
FIG. 7A to FIG. 7C are plan views for illustrating the latter half of the strip layout for stamping in the progressive die.
Figure 7B:
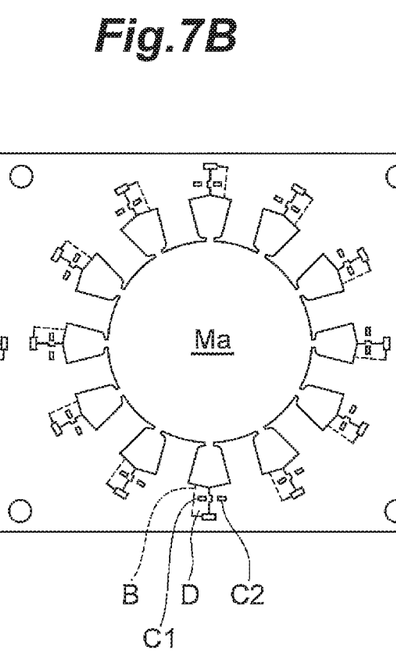
Figure 7C:
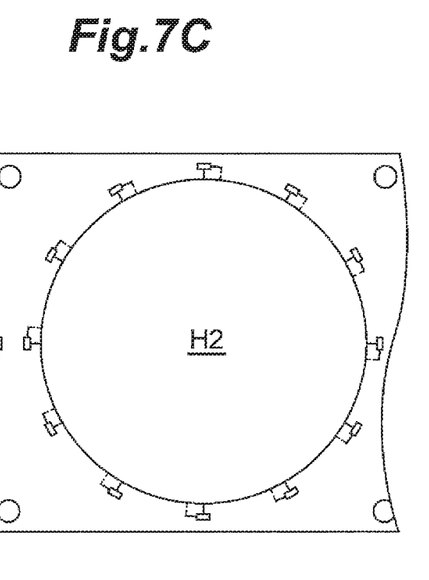

Referring to FIGS. 6A to 6C and FIGS. 7A to 7C, the step (B) will be described. FIG. 6A to FIG. 6C are plan views for illustrating the first half of a strip layout for stamping in the progressive die. FIG. 7A to FIG. 7C are plan views for illustrating the latter half of the strip layout for stamping in the progressive die. The strip layout for stamping is not limited to that depicted in these drawings, and a step for balancing press loads may be added, for example.

The step B1 is a step of forming a total of 12 openings H1 on the sheet W on which pilot holes P have been formed (see FIG. 6A). The openings H1 are used for making it easier to perform the cutting-and-bending processing at a step B3 described later. The openings H1 may not be necessarily formed, but forming the openings H1 at positions depicted in FIG. 6A can reduce abrasion of a punch used for the cutting-and-bending processing.

A step B2 is a step of forming a total of 12 slot holes M1 on the sheet W (see FIG. 6B). A case has been exemplified here in which the slot holes M1 are formed (step B2) after forming the openings H1 (step B1), but the openings H1 may be formed after forming the slot holes M1.

The step B3 is a step of forming the slit line SL and the bending line B by the cutting-and-bending processing (step (b1)) and then returning by push-back the bent part D to the original position (step (b2)) (see FIG. 6C).

A step B4 is a step of forming a through hole Ma (see FIG. 7A). Performing this step connects the 12 slot holes M1 and the through hole Ma.

A step B5 is a step of forming the swaged portions C1 on the bent parts D (step (b3)) and forming the swaged portions C2 that forms pairs with the swaged portions C1 (see FIG. 7B). The through holes h are formed instead of the swaged portions C1 and C2 on the workpiece MS constituting the lowermost layer of the laminated core S. A case has been exemplified here in which the swaged portions C1 and C2 are formed (step B5) after forming the through hole Ma (step B4), but the through hole Ma may be formed after forming the swaged portions C1 and C2.

A step B6 is a step of stamping out the workpieces MS on the outer circumferences (step of forming an opening H2) (see FIG. 7C). The opening H2 is positioned inside the openings H1 that are arranged so as to be aligned on a circle concentric with the opening H2.

A predetermined number of the workpieces MS (FIG. 2) obtained through the above-described steps B1 to B6 are stacked together, and these workpieces MS are fastened together by the swaged portions C1 and C2 to obtain the laminated core S (step (C)). The fastened laminated core S is discharged from the progressive die 140 when the progressive die 140 used is a die having a function to stamp out the workpieces MS on the outer circumferences and, at the same time, serially fasten these workpieces MS to a laminate of workpieces MS that has been already produced.

According to this embodiment, forming the swaged portions C1 on the bent parts D can prevent the bent parts D from splitting at the connection part J (see FIG. 4B). Thus, the laminated core S that can achieve both high motor torque and low cogging torque at sufficiently high levels can be obtained.

Figure 8:
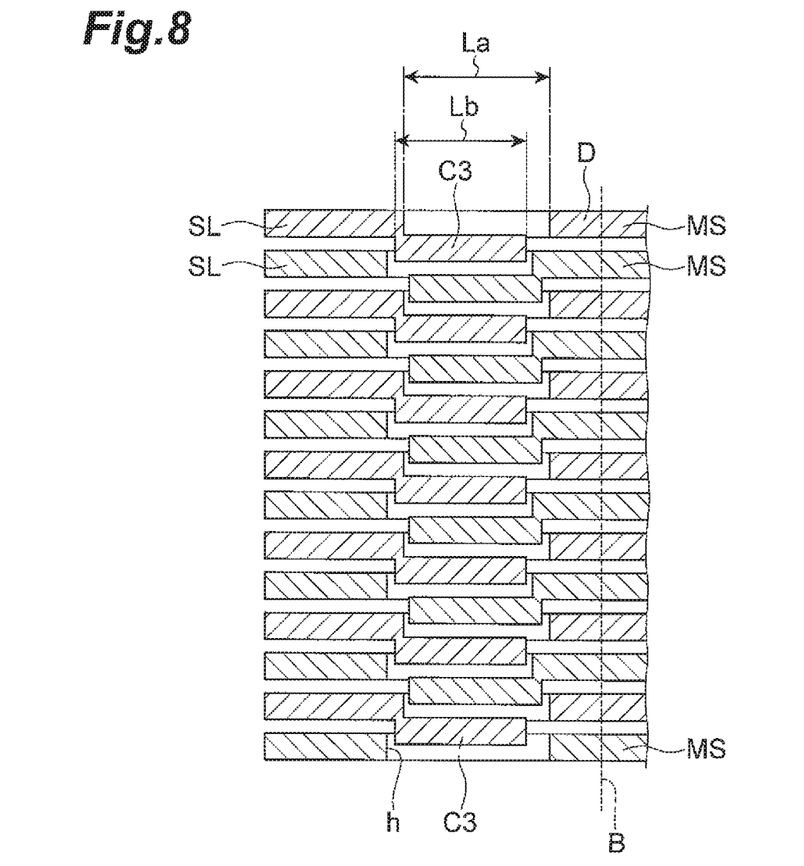
FIG. 8 is a sectional view of another example (alternate swaged portion) of the swaged portion preferable for being formed on a bent part.

In the foregoing, one embodiment of this disclosure has been described, but the present invention is not limited to the above-described embodiment. In the above-described embodiment, a case has been exemplified in which the swaged portions C1 of the mode depicted in FIG. 4A to FIG. 4C are formed on the bent parts D, but, alternatively, swaged portions C3 of a mode depicted in FIG. 8 may be formed on the bent parts D, for example. The swaged portions C3 depicted in FIG. 8 constitute alternate swaged portions. The swaged portion C1 in the above-described embodiment is continuous in a longitudinal section in the direction orthogonal to the bending line B (see FIG. 4B), but the swaged portion C3 constituting the alternate swaged portions is partially discontinuous in a longitudinal section in the orthogonal direction. As depicted in FIG. 8, the swaged portion C3 also satisfies the above-described condition (the length La>the length Lb).

Figure 9:
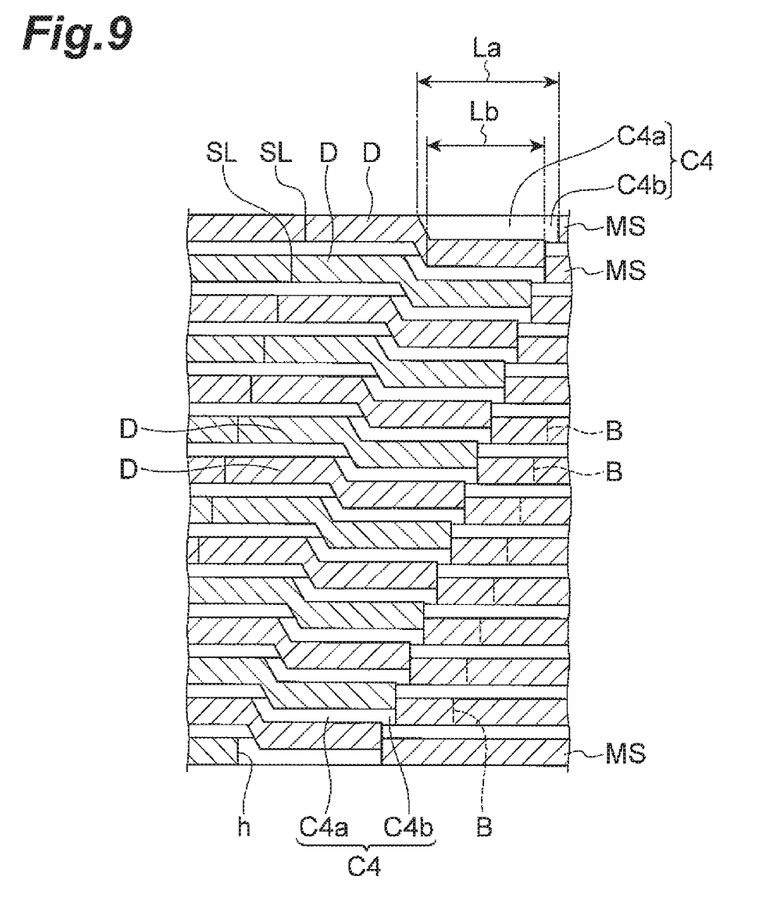
FIG. 9 is a sectional view of still another example (skewed swaged portions) of the swaged portion preferable for being formed on a bent part.

In the above-described embodiment, the swaged portions C1 have been exemplified in which the longitudinal directions are orthogonal to the bending lines B, but the swaged portions may extend to form arcs of a circle centered at the axial line of the laminated core S. For example, swaged portions C4 of a mode depicted in FIG. 9 may be formed on the bent parts D instead of the swaged portions C1 of the mode depicted in FIG. 4A to FIG. 4C. The swaged portions C4 depicted in FIG. 9 constitute skewed swaged portions. The term skewing here means fastening the workpieces MS each shifted by a predetermined angle (5°, for example) (see FIG. 1 in Japanese Patent No. 4472417). An arc part C4a extending along the circle centered at the axial line of the laminated core S and an aperture C4b formed at one end of this arc part C4a constitute the swaged portion C4. As depicted in FIG. 9, the swaged portion C4 also satisfies the above-described condition (the length La>the length Lb). The cogging torque can be further reduced by causing the connection part J to be wider in the circumferential direction by skewing, in addition to forming the swaged portions C4 on the bent parts D to prevent the bent parts D from splitting at the connection part J.

In the above-described embodiment, a case has been exemplified in which one core piece Sd includes one tooth part St, but one core piece Sd may have a plurality of tooth parts St.

In the above-described embodiment, a case has been exemplified in which the laminated core S that includes the tooth parts St extending from the inner periphery of the yoke part Sy toward the center is produced, but the method according to this disclosure may be applied to production of a laminated core (of an outer rotor type, for example) that includes tooth parts St extending outward.

In the above-described embodiment, a case have been exemplified in which only the workpieces MS are stamped out of one sheet W, but both of the workpieces MS and the workpieces for a rotor may be stamped out of one sheet W. In this case, the workpieces for a rotor are preferably stamped out of portions that are to be the through holes Ma at a step before the step B4 (see FIG. 7A). Furthermore, the workpieces may be stamped out of a plurality of the sheets W that are stacked together.

In a method disclosed in Japanese Patent No. 4472417, swaged parts 11C are formed at positions distant from slit lines L, as depicted in FIG. 5 in Japanese Patent No. 4472417. In terms of positional relations between the slit line L, a bending line formed by cutting-and-bending processing, and the swaged part 11C, the bending line is formed between the slit line L and the swaged part 11C (see FIG. 6A in Japanese Patent No. 4472417).

FIG. 10A illustrates positional relations between a slit line SL between adjacent two laminated core pieces S1 and S2, a bending line B, and a swaged portion C1 on the laminated core piece S1. In FIG. 10A, the bending line B is formed between the slit line SL and the swaged portion C1 as in Japanese Patent No. 4472417. A swaged portion C2 formed on the laminated core piece S2 forms a pair with the swaged portion C1, and the slit line SL is positioned at the substantially middle point between the swaged portion C1 and the swaged portion C2. A case has been exemplified here in which the slit line SL is formed at the substantially middle point between the swaged portion C1 and the swaged portion C2, but the slit line SL may be formed at a position between the swaged portion C1 and the swaged portion C2 and near either one of the swaged portions.

FIG. 10B is a sectional view along the line b-b depicted in FIG. 10A and illustrates a state in which a plurality of workpieces that have been produced through a push-back step and a process of forming swaged portions are laminated and a plurality of swaged portions C1 and swaged portions C2 each aligned vertically are fastened. When a laminated core is produced in this manner, the bent parts D (portions between the bending lines B and the slit lines SL) are likely to split in the laminating direction at the connection part J between the laminated core pieces S1 and S2 as depicted in FIG. 10B. One of the main causes of this splitting is thought to be difficulty in returning the bent parts D of all the workpieces completely to their original positions by push-back, followed by fastening the bent parts D in this state by the swaged portions C1. In FIG. 10B, the dashed line indicates the position of the bending line B.

When the connection part J between the laminated core pieces S1 and S2 is in a state depicted in FIG. 10B, the connection part J generates larger magnetic resistance than that in a case in which workpieces to be connected are completely connected to each other at the connection part J, resulting in tendency of motor torque to decrease. Furthermore, degrees of splitting of the bent parts D at a plurality of connection parts J included in the segmented laminated core are not necessarily uniform. In other words, the magnetic resistance varies in the circumferential direction, resulting in tendency of cogging torque to increase.

A plurality of embodiments of this disclosure has an object to provide a segmented laminated core that can achieve both high motor torque and low cogging torque at sufficiently high levels, and a method for manufacturing the segmented laminated core.

A plurality of embodiments of this disclosure relates to a method for manufacturing a segmented laminated core. This manufacturing method includes the following steps:

(A) feeding a plate for processing drawn from a roll thereof to a progressive die;

(B) stamping out workpieces in the progressive die, each workpiece including a plurality of pieces aligned in a circumferential direction with a circumferential part; and (C) fastening the workpieces together to obtain a segmented laminated core.

The above-described step (B) includes (b1) performing cutting-and-bending processing to form a slit line and a bending line across a region configured to be the circumferential part, (b2) returning by push-back a bent part that is a portion between the slit line and the bending line to its original position, and (b3) forming a swaged portion on the bent part. The above-described step (C) includes (c1) fastening the workpieces by the swaged portion.

In a plurality of embodiments of this disclosure, a swaged portion is formed on a bent part. Specifically, the swaged portion is formed at a position (on the bent part) near the slit line in this disclosure, while the swaged portion have been conventionally formed at a position distant from the slit line (see FIG. 10A). Thus, the bent parts can be sufficiently prevented from splitting in the laminating direction by fastening the bent parts to each other by the swaged portions even when the bent parts of all the workpieces are not completely returned by push-back to their original positions. Accordingly, a segmented laminated core produced by this method can achieve both high motor torque and low cogging torque at sufficiently high levels.

The swaged portion may be formed on the bent part and may be formed on the bending line, for example. At the step (B), the step (b3) may be performed before the step (b1), but it is preferable to perform the step (b3) and the step (b2) at the same time or perform the step (b3) after the step (b2), from a viewpoint of reliably preventing the swaged portion from being crushed by push-back.

A plurality of embodiments of this disclosure provide a segmented laminated core obtained by fastening a plurality of workpieces to each other, each workpiece including a plurality of pieces aligned in the circumferential direction with a circumferential part. The workpieces constituting the segmented laminated core each includes a swaged portion on a bent part that is a portion of a circumferential part between a slit line and a bending line formed by cutting-and-bending processing in its manufacturing process, and the workpieces are fastened to each other by the swaged portions. This segmented laminated core can be produced by the above-described manufacturing method and can achieve both high motor torque and low cogging torque at sufficiently high levels.

Preferably, swaged portions of a plurality of embodiments of this disclosure each includes a depression on one face of a workpiece and a projection on the other face of the workpiece, and an opening length La of the depression in the direction orthogonal to a bending line on the one face of the workpiece is larger than a length Lb of the top of the projection in the direction orthogonal to the bending line. Forming swaged portions having such a constitution on bent parts can more securely fasten workpieces overlapping each other by the swaged portions even when the bent parts are not completely returned to their original positions, in other words, even when the positions of depressions and projections to be fitted are out of alignment to some extent.

A segmented laminated core according to a plurality of embodiments of this disclosure provides sufficiently low cogging torque, as described above. For this reason, a preferable example of its usages is a stator for an electric power steering system, in which smooth rotation is required. In this case, the segmented laminated core may have an outer diameter of about 50 to 100 millimeters.

With a plurality of embodiments of this disclosure, a segmented laminated core that can achieve both high motor torque and low cogging torque at sufficiently high levels are provided.

Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modification as would fall within the scope and spirit of the inventions.

What is claimed is:

1. A method for manufacturing a segmented laminated core, comprising the steps of:
   (A) feeding a plate for processing drawn from a roll thereof to a progressive die;
   (B) stamping out workpieces in the progressive die, each workpiece including a plurality of pieces aligned in a circumferential direction with a circumferential part; and
   (C) fastening the workpieces together to obtain the segmented laminated core, wherein the step (B) includes the steps of:
   (b1) performing cutting-and-bending processing to form a slit line across a region configured to be the circumferential part, and a bending line across the region;
   (b2) returning by push-back a bent part created by the cutting-and-bending processing that is a portion between the slit line and the bending line to return the bent part to its original position; and
   (b3) forming a swaged portion on the bent part, and wherein the step (C) includes the step of:
   (c1) fastening the workpieces by the swaged portion.

2. The method according to claim 1, wherein:
   the swaged portion includes:
      a depression on one face of the workpiece; and
      a projection on another face of the workpiece, and
   an opening length La of the depression in a direction orthogonal to the bending line on the one face of the workpiece is larger than a length Lb of a top of the projection in the direction orthogonal to the bending line.

3. The method according to claim 2, wherein the segmented laminated core is a stator for an electric power steering system.

4. The method according to claim 1, wherein the segmented laminated core is a stator for an electric power steering system.

5. The method according to claim 1, wherein the bending line, the swaged portion, and the slit line are formed so as to align in the circumferential direction.

* * * * *